┌─────────────────────────────────────────┬──────────────────────────────────┐

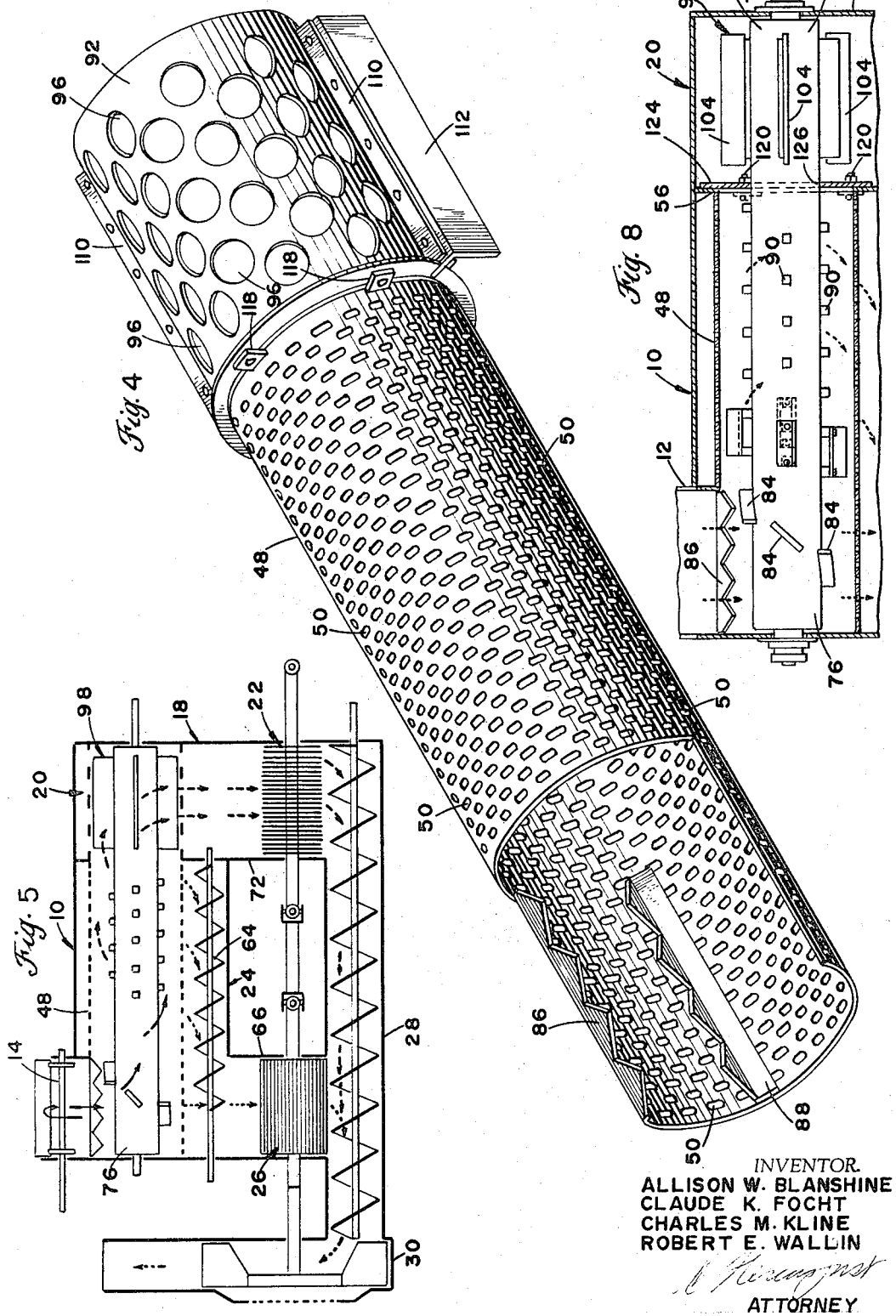

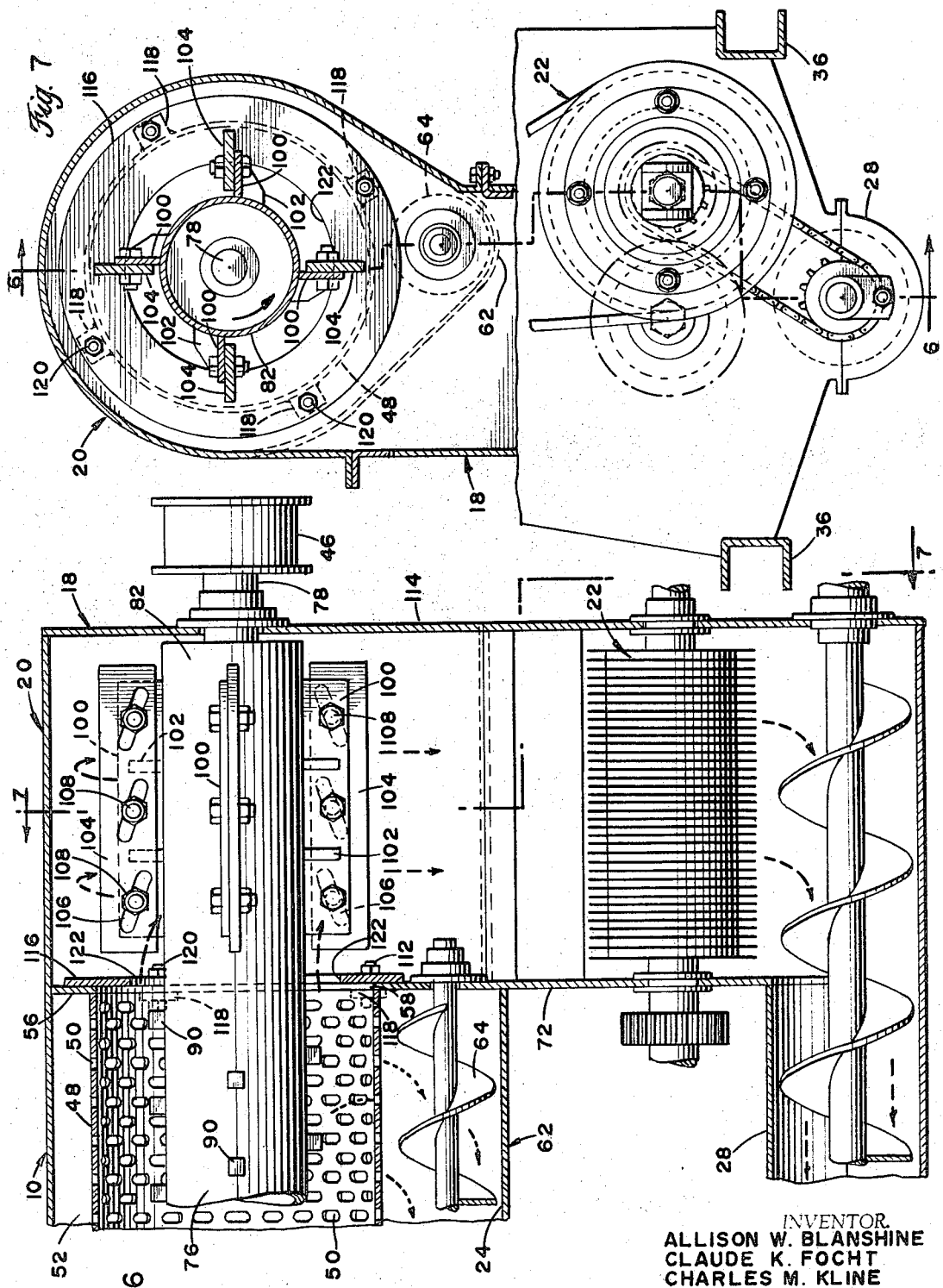

United States Patent Office 3,401,727
Patented Sept. 17, 1968

---

3,401,727
CORN SHELLING AND COB-HUSK SHREDDING MECHANISM
Allison W. Blanshine, Lititz, Claude K. Focht, New Holland, Charles M. Kline, Reinholds, and Robert E. Wallin, New Holland, Pa., assignors to Sperry Rand Corporation, New Holland, Pa., a corporation of Delaware
Filed July 19, 1966, Ser. No. 566,365
3 Claims. (Cl. 146—71)

---

ABSTRACT OF THE DISCLOSURE

A corn processing machine including a housing with inlet means to receive ears of corn, and shelling and shredding means therein operable to separate the kernels from the cobs, shred the cobs, and combine the kernels and shredded cob material in predetermined proportions, said shelling and shredding means comprising a stationary cylindrical perforated screen having a rotatable arbor therein to shell and separate the kernels from the cobs and said screen having serrated sheller bars therein adjacent the inlet thereof to facilitate the shelling operation.

---

This invention pertains to mechanism for receiving ears of corn, shelling the kernels therefrom, and shredding the cobs-husks, preferably as a continuous process. Essentially, the present invention comprises details of corn shelling and cob-husk shredding mechanism included in the general, overall corn processing system comprising the subject matter of co-pending application Ser. No. 546,280, filed Apr. 29, 1966, and owned by the same assignee as the instant invention.

In the aforementioned co-pending application, the overall corn processing system comprising the subject matter thereof contemplates treating ears of corn, regardless of whether husks remain thereon, or have previously been removed from the ears, shelling the kernels therefrom, shredding the cobs-husks to desired ranges of fineness, cracking the corn kernels and recombining all of the cracked kernels with either all of the shredded cobs-husks or any desired percentage thereof, to produce a feed mixture particularly adapted for feeding to cattle. Certain novel features and details are included particularly in the corn shelling and cob-husk shredding mechanism of said overall processing system and machine, whereby the object of the present application is to describe said features and details in greater particularity than in said co-pending application, and also in claiming certain characteristics thereof in greater detail than embodied in the claims of said co-pending application.

Corn processing machines have been developed heretofore which embody a combination of means for receiving and shelling ears of corn, removing the shelled kernels, and, as an additional operation, reducing the size of the cobs-husks. The specific mechanism for accomplishing this and the sequence of operations employed in said prior machines is somewhat complex as well as being somewhat inefficient. Further, such prior mechanisms are relatively devoid of possibility of adjustments and variations in operation so as to provide desired versatility especially in producing various degrees of size ranges of shredded cob-husk products, for example.

It is the principal object of the present invention, therefore, to provide a highly efficient and relatively simple design of apparatus preferably employing a straight-through principle wherein ears of corn are initially subjected to a shelling operation while continuously moving longitudinally toward the discharge end of the machine, whereby the cobs, after all the kernels have been removed therefrom, pass directly into a cob-husk shredding apparatus preferably operated by the same power means as the shelling mechanism.

Another object of the invention is to provide shredding means which is adjustable to permit the production of various size ranges of shredded cob-husk material and proportions thereof relative to cracked corn content of the ultimate mixture thereof.

A further object of the invention is to provide mechanism by which the rate at which cobs-husks pass into the shredding mechanism may be controlled.

Still another object of the invention is to provide a substantially cylindrical screen within which an arbor rotates for purposes of shelling kernels from ears of corn introduced into one end of the screen, such shelling continuing while the material moves longitudinally away from the entrance end of said screen and additionally providing means adjacent the entrance end of the screen to facilitate the shelling operation and also minimize the possibility of incompletely shelled ears of corn from tending to move reversely through the entrance of the screen during rotation of the arbor therein.

Details of the invention and the foregoing objects thereof, as well as other objects of the invention are set forth in the following specification and illustrated in the accompanying drawings comprising a part thereof.

In the drawings:

FIG. 3 is a vertical sectional view of the cob-husk shredding end of the corn processing machine shown in FIG. 1 as seen on the line 3—3 of said figure.

FIG. 4 is a perspective view of the cylindrical screen comprising part of the corn shelling mechanism of the machine shown in FIG. 1 and a cylindrical shell comprising part of the cob-husk shredding mechanism connected to the discharge end of said screen.

FIG. 5 is a vertical sectional diagrammatic view of the processing machine shown in FIG. 1 and illustrating the various paths of the different ingredients of the product material as produced and mixed by the machine.

FIG. 6 is a fragmentary vertical longitudinal sectional view of the cob-husk shredding end of the machine as seen on the line 6—6 of FIG. 7 and illustrating a different embodiment from that of the preceding figures.

FIG. 7 is a vertical elevation, partly in vertical section of the cob-husk shredding end of the machine illustrated in FIG. 6, as seen on the line 7—7 of FIG. 6.

FIG. 8 is a fragmentary vertical sectional view through the corn shelling and cob-husk shredding mechanism of the machine shown in FIG. 1 and illustrating a different arrangement of certain details of said mechanism from that illustrated in FIG. 1 as when the machine is intended only to crack shelled corn.

Figure 1:
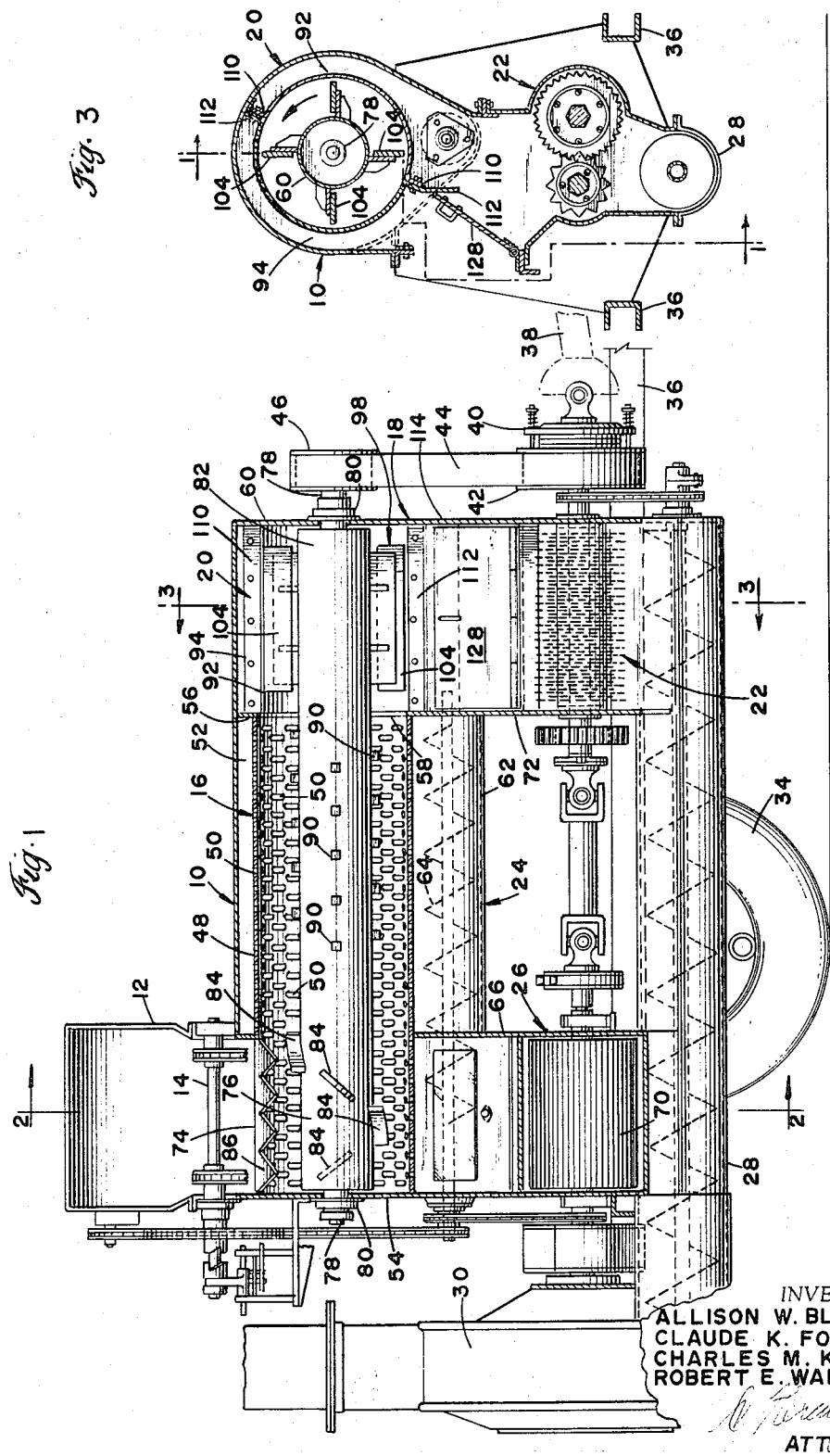
FIG. 1 is a vertical elevation of a preferred embodiment of corn processing machine incorporating the principles of the present invention and shown partly in vertical section as seen on the line 1—1 of FIG. 3.
Figure 2:
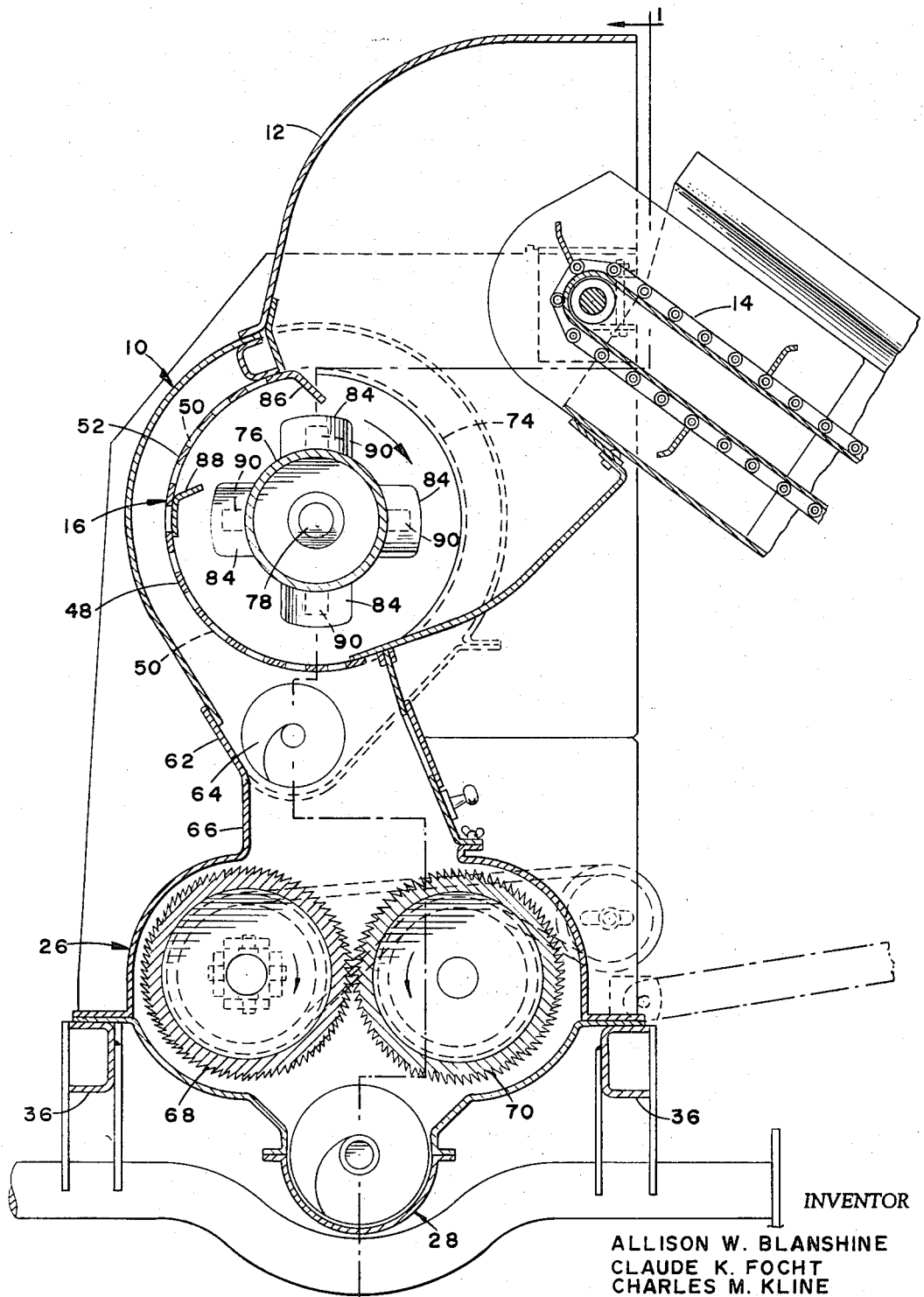
FIG. 2 is an enlarged transverse, partially fragmentary, vertical sectional view of the corn processing machine shown in FIG. 1, as seen on the line 2—2 of said figure.

Referring to the drawings, and especially FIG. 1, the entire processing machine of which the present invention comprises a part includes a general housing 10 having entrance means 12 to which the upper end of a conveyor 14, best shown in FIG. 2, delivers ears of corn to be processed, it being understood that said ears may contain some or all of the husks originally thereon at the time of harvesting. The primary functioning inter-related units of the machine, which are enclosed within the housing 10, comprise a corn shelling unit 16 which is substantially in axial alignment with a cob-husk shredding unit 16 which includes a coarse chopping or shredding unit 20 which is directly in axial alignment with the corn shelling units 16, and a finer cob-husk shredding unit 22 which is vertically below the coarse chopping unit 20.

As the corn kernels are removed by the shelling unit 16 from the cobs-husks, they pass to upper conveyor 24 for delivery to a corn cracking unit 26 which cracks the kernels of shelled corn and discharges the same into a lower conveyor 28 which, at the right-hand end thereof, as viewed in FIG. 1, receives the resulting cob-husk products from the cob-husk shredding section 18, after successive action by both the coarse and fine processing units and, depending upon the desired product, either all, a desired portion, or none of the cob-husk product is progressively mixed with the cracked corn products to produce a preferably homogeneous mixture for delivery to a blower 30 where further mixing is accomplished as well as the product being blown into a suitable conduit 32 for delivery to storage, feed carts, or the like.

Details of the operation of the entire corn processing machine illustrated in FIG. 1 and outlined above are set forth in said co-pending application, Ser. No. 546,280, to which attention is directed for further descriptions and explanations not set forth hereinafter with respect to either the entire machine or units with which the present invention is not specifically concerned.

As has been indicated above, the present invention relates primarily to details of the corn shelling unit 16 and the coarse chopping unit 20 in which cobs-husks are reduced to an initial, relatively coarse size, after which the relatively coarse product may be further reduced in size by passing the same through the finer shredding unit 22. Coarse husks are shredded as they pass through unit 20. Details of the corn shelling unit 16 and coarse-chopping unit 20, therefore, now will be described.

As has been indicated in said co-pending application, Ser. No. 546,280, the entire corn processing machine may be of a portable type supported upon wheels 34 and mounted upon an appropriate frame 36 with which the wheels 34 are associated. If desired, the entire machine may be mounted, suitably, on a fixed foundation, wherever desired, such as in a processing shed. Particularly if the machine is portable, it may derive power to drive the various elements of the machine from a suitable drive shaft 38, for example, shown in FIG. 1, which is connectable to the P.T.O. of a tractor.

The drive shaft 38 is connected preferably to a safety type clutch 40 which is capable of slipping in the event an overload occurs. Said clutch drives a driving sheave 42 which, by means of a belt 44, drives a driven sheave 46. The movable elements of the units of the entire corn processing machine with which the present invention is concerned are driven by sheave 46 through arrangements set forth hereinafter.

The corn shelling unit 16 essentially comprises a cylindrical screen 48 which preferably is made from sheet metal of suitable gauge and is of appropriate length as can be seen in FIG. 1. Preferably, short slots or elongated holes 50 are punched substantially in an even pattern throughout the overall surface of the screen 48 for purposes of discharging shelled kernels of corn therethrough. Screen 48 is contained within the upper part of overall housing 10, as is best seen from FIGS. 1 and 2, said upper part of the housing preferably being generally cylindrical so as to provide a somewhat elongated, annular discharge space 52 into which the shelled kernels of corn are discharged through holes 50.

One end of the cylindrical sleeve 48 is closed by an end wall 54 shown at the left-hand end of the overall housing 10 as shown in FIG. 1, and at the opposite end, said screen terminates at an inner wall 56, shown in FIG. 1. In the embodiment of the invention shown in FIG. 1, said inner wall 56 also has a discharge opening 58 therein of similar diameter to screen 48, through which cobs-husks are discharged from the shelling unit 16 into the additional housing 60 which actually comprises a part of overall housing 10 and is a continuation of that part of said housing within which the corn shelling unit 16 is contained.

At the right-hand end of housing 10, as viewed in FIG. 1, the additional housing 60 is defined by the right-hand end wall of the overall housing 10. The intermediate portion of housing 10 between the left and right-hand ends thereof, as viewed in FIG. 1, also has a lower portion 62, the bottom surface of which is partially cylindrical for purposes of being complementary to containing the auger 64 of upper conveyor 24. Said lower intermediate portion 62 of the housing 10 merges with the lower portions of the upper cylindrical portion of the housing which defines the annular discharge space 52.

With further reference to FIG. 1, it will be seen that the intermediate portion 62 of housing 10 terminates at the left-hand end in a vertical discharge conduit 66 which extends downward to the corn cracking unit 26 and communicates with the interior of that portion of the housing which contains cooperating cracking rollers 68 and 70, best shown in FIG. 2. The opposite end of said lower intermediate portion 62 of housing 10 terminates in another vertical discharge conduit 72 which extends downwardly therefrom and communicates with the finer shredding unit 22 by which the coarse cob-husk products from chopping unit 20 is reduced to finer size before being discharged into lower conveyor 28.

The cylindrical screen 48 is fixed at its opposite ends, for example, respectively to the end wall 54 and the inner wall 56. Preferably, the screen 48 extends substantially horizontally and the left-hand end thereof has an inlet 74 which, as can be best seen from FIG. 2, extends circumferentially for substantially 180° and is commensurate in length with the entrance means 12 shown in FIG. 1. The portion of the screen between the entrance means 12 and inner wall 56 however is preferably continuously cylindrical and has no other openings in the walls thereof except the holes 50 which are of suitable size to permit the discharge of kernels therethrough.

Mounted for coaxial rotation within the screen 48 is an arbor 76 which is supported upon a rotatable shaft 78. The shaft is mounted in suitable bearings 80 which respectively are affixed to the opposite end walls of the housing 10 and the shaft is driven by sheave 46. The major portion of arbor 76 is coextensive with the screen 48, but the hight-hand end portion 82 of the arbor is considered to be an extension of the arbor for coaxial operation within the coarse-chopping unit 20.

A series of radial shelling projections 84 are fixed to the lefthand end of the arbor 76 adjacent the inlet 74. It will be seen from FIG. 1 that the projections 84 are angularly disposed and actually comprise an interrupted spiral flight having a pitch directed and extending suitably upon the arbor with respect to the direction of rotation thereof so as to feed ears of corn in an axial direction away from the inlet 74, toward the discharge opening 58. Said rotation is in the direction of the arrow shown in FIG. 2.

To facilitate the shelling operation, especially in the initial stage thereof and also to minimize any tendency of the rotation of the arbor and the projections 84 to eject ears of corn back through the inlet 74 as the arbor rotates, a plurality of sheller bars 86 and 88 are fixed to the inner surface of the screen 48 adjacent inlet 74. Preferably, the sheller bars 86 and 88 have angularly related portions in cross-section, as can be seen from FIG. 2. One portion thereof is fixed flatly to the inner surface of screen 48, while the other portion extends at an acute angle to the inner surface of screen 48 and the terminal edges of said sheller bars are angularly toothed or serrated as can be best seen in FIG. 1.

The sheller bar 86 preferably is disposed substantially at the 12 o'clock position as viewed in FIG. 2, while the sheller bar 88 is disposed at the 9 o'clock position. Further, the sheller bar 86 extends along the trailing side edge of the inlet opening 74, considered with respect to the direction of rotation of the arbor 76. The radial dimension of the projections 84 is sufficient to effect appropriate impelling movement to the ears of corn but the outer extremities of the projections are slightly spaced from the terminal edges of the sheller bars 86 and 88 as can be seen in FIG. 2 so that no interference occurs between the same but the clearance spaces preferably are such that they are less than the diameter of an ear of corn.

Further to induce the shelling of kernels from the ears of corn delivered to the screen 48, the arbor 76 also is provided on that portion thereof which is between the inlet 74 and discharge opening 58 with a plurality of similar radial lugs 90 which function adequately to completely remove all kernels from the ears of corn by the time the same are moved circumferentially within the screen 48 and longitudinally thereof toward the discharge opening 58, whereby only bare cobs-husks are discharged through the opening 58 into the coarse-chopping unit 20.

As the kernels of corn are removed from the cobs by the shelling apparatus described hereinabove, they pass through the holes 50, either directly into space 52 or into discharge conduit 66 and from which the kernels fall into upper conveyor 24 and are moved thereby into the discharge conduit 66 for delivery of all of the kernels to the corn cracking unit 26.

Referring to FIGS. 1, 3 and 4 particularly, the coarse-chopping unit 20 which preferably comprises only one unit of an overall multi-unit cob-husk shredding means 18, comprises a stationary cylindrical shell 92 which preferably is coaxial with screen 48 and is connected thereto as well as being enclosed within the additional housing portion 60 of the main housing 10 for the entire machine. Stationary shell 92 preferably is substantially of similar diameter to the screen 48, whereby there is a surrounding space 94, see FIG. 1, between the additional housing 60 and said shell into which chopped pieces of corn cob-husk are discharged through the holes 96 formed in the shell 92 preferably in a relatively uniform pattern and extending substantially throughout the entire area of the shell as readily can be seen from FIG. 4.

Holes 96 are of a diameter sufficiently large to permit portions of corn cobs to project at least partially therethrough and thereby momentarily be restrained in movement to permit the action of the bladed chopper 98 which comprises the extension 82 of the arbor 76 to be effective with respect to reducing the corn cobs into relatively coarse pieces. This arrangement also is highly effective to cause at least preliminary chopping of husks, as well as cobs, by the shearing action between holes 96 and chopper 98.

The bladed chopper 98 is substantially coextensive with the stationary shell 92 and is enclosed thereby as well as being coaxial therewith. Said chopper comprises a plurality of longitudinally and axially extending supporting members 100 which are fixed to the extension 82 of the arbor by any suitable means such as welding. They also project radially therefrom a limited distance, best illustrated in FIGS. 6 and 7, and are braced by appropriate ears 102 which likewise are welded to the arbor extension 82 and the members 100.

The plurality of supporting members 100 are spaced evenly circumferentially around arbor extension 82 and respectively support similar radially extending blades 104. Blades 104, as can best be seen from FIGS. 1, 6 and 7, preferably are formed from sheet material of appropriate gauge and are rectangular in plan view. The longitudinal edge surfaces likewise are transverse to the plane of each blade, whereby as can be visualized especially in cross-section as shown in FIG. 7, each blade presents four longitudinally extending shearing edges comprising the longitudinal corner edges of each blade. Hence, each blade actually includes four shearing edges which may be remounted in operative position successively by either reversing the blade end-for-end or edge-for-edge, depending upon whether the blade is rotated about its longitudinal or transverse axis, thereby greatly extending the life of each blade.

The blades 104 also preferably are provided with a series of diagonally extending slots 106, see FIG. 6, through which appropriate clamping bolts 108 extend, the bolts also extending through suitable holes formed in supporting members 100. By such arrangement, very accurate radial adjustment of the blades 104 with respect to the arbor extension 82 may be effected, especially for controlling the distance between the effective operative shearing edge of each blade and the inner surface of the stationary shell 92 for example in the embodiment of FIGS. 1–4. Appropriate adjustment permits the production of desired coarse sizes of cob pieces and husk slivers.

Shell 92 may be omitted in certain operations of the coarse-shopping unit 20, when desired, as shown in FIGS. 6 and 7, especially when the ears of corn are relatively free of husks. By reference to FIG. 3 in particular, it will be seen that the stationary shell 92 is bi-partite and the parts respectively are provided with a plurality of circumferentially spaced, longitudinally extending flange-like ears 110 which are detachably connectable to a plurality of corresponding longitudinally extending supporting bars or flanges 112 extending radially, see FIGS. 1 and 3, which are fixed at the ends thereof for example, between inner wall 56 and outer end wall 114 of coarse-chopping unit 20. The sections of shell 92 preferably are secured detachably to bars 112 by removable bolts.

In the embodiment shown in FIG. 1, the stationary shell 92 is mounted in operative position for shearing relationship of the holes 96 therein with respect to the operative edge of each of the blades 104 as the same are rotated about the axis of shaft 78 by power supplied to sheave 46. The operative direction of rotation thereof is shown by the arrow in FIG. 3 with respect to shaft 78. In this arrangement, the discharge opening 58 from screen 48 preferably is fully open as shown in FIG. 1.

In the arrangement of the coarse-chopping unit 20 illustrated in FIGS. 6 and 7, however, wherein screen 92 has been removed, rather than the discharge opening 58 being fully opened, it is constricted. Such constriction is effected by an annular plate-like ring 116 which, for example, may be bolted to a plurality of radially extending ears 118, see FIGS. 4, 6 and 7 which are fixed, such as by welding, to the exterior surface of screen 48 for example. The ears are provided with suitable holes through which bolts 120 extend, see FIGS. 6 and 7, the bolts also extending through coaxial holes formed in the plate-like ring 116. The inner periphery of plate 116 defines a circular discharge opening 122 which is of a smaller diameter than the principal discharge opening 58 which it replaces in the embodiment shown in FIGS. 6 and 7.

In the embodiment of FIGS. 6 and 7, therefore, wherein stationary shell 92 is omitted, disintegration of the cobs-husks within the coarse-chopping unit 20 occurs primarily by the flailing and chopping action of the cobs-husks effected by the blades 104 per se within unit 20. By restricting the delivery of cobs-husks to chopping unit 20, the chopping action provided by bladed chopper 98 is adequate, especially to operate upon cobs-husks alone which are relatively free of husks.

Under circumstances where it is desired to operate the machine solely to crack shelled kernels of corn, the plate-like ring 116 shown in FIGS. 6 and 7 is removed and flat ring plate 124, shown in FIG. 8, is substituted therefor. The latter has a central opening 126 only slightly larger than the outer diameter of arbor 76 or extension 82 to provide running clearance therebetween. Hence, no material, including kernels of corn can pass into coarse chopping unit 20 which, under the circumstances, runs idle. Pre-shelled corn kernels are thereby simply fed to entrance means 12 and pass directly down vertical conduit 66 to cracking unit 26.

When it is desired to mix less than the full cob-husk product with cracked corn, a discharge door 128, shown in FIGS. 1 and 3, may be moved inwardly at the top, to any desired degree, to discharge coarsely chopped cob-husk product from the machine directly before it passes to finer shredding unit 22, regardless of whether shell 92 is mounted for operation or not.

While the invention has been described and illustrated in its several preferred embodiments, it should be understood that the invention is not to be limited to the precise details herein illustrated and described since the same may be carried out in other ways falling within the scope of the invention as claimed.

Having thus described our invention, what we claim is:

1. A corn processing machine to prepare ears of corn for livestock feeding comprising in combination, a housing extending longitudinally substantially horizontally in use, inlet means adjacent one end of said housing to receive ears of corn, shelling means comprising a substantially cylindrical screen supported stationarily by and extending longitudinally within said housing from said inlet means toward the opposite end of said housing and having an entrance opening communicating with said inlet means to receive ears of corn to be shelled and the end of said screen opposite the entrance opening comprising cob-husk discharge means, an elongated arbor extending coaxially within said screen and rotatable about the axis thereof, radial shelling projections on said arbor, power means connectable to said arbor to rotate it, sheller bars extending longitudinally along and radially inward from and connected to the inner surface of said screen adjacent the entrance end thereof, said bars being spaced circumferentially of said screen at said entrance end thereof and the free edges thereof being serrated and said bars being operable to minimize the passage of ears of corn upwardly through said opening after entering said screen and while being moved about said arbor by the rotation thereof, kernel receiving means exterior of said screen and substantially coextensive therewith, and cob-husk shredding means coaxial with said screen and adjacent said cob-husk discharge means thereof to receive cob-husks therefrom, said shredding means comprising a stationary shell coaxial with said screen and extending axially from the discharge end thereof, and a bladed chopper within said shell coaxial with said arbor in said screen and rotatable therewith to effect shredding of said cobs-husks, said shell having means to discharge shredded cobs-husks radially therefrom and said screen discharging shelled kernels therethrough.

2. The corn processing machine according to claim 1 in which said entrance opening of said screen is in the upper surface thereof and one of said serrated bars is secured to said screen immediately adjacent the trailing edge of said opening with reference to the direction of rotation of said arbor and another of said bars being spaced circumferentially in trailing direction relative to said first-mentioned bar.

3. The corn processing machine according to claim 2 further including a series of radially extending vanes carried by the end of said arbor adjacent the entrance end of said screen and positioned to define an interrupted spiral vane, the free ends of said vanes being spaced a limited distance radially inwardly from the serrated edges of said sheller bars and cooperable therewith to facilitate shelling of ears of corn and move cobs-husks longitudinally away from said entrance opening toward said cob-husk discharge of said screen.

References Cited
UNITED STATES PATENTS

| | | | |
|---|---|---|---|
| 1,530,095 | 3/1925 | Sharp | 146—107 |
| 1,770,792 | 7/1930 | Lizamore | 130—6 |
| 1,929,586 | 10/1933 | Holland-Letz | 146—121 |
| 2,271,898 | 2/1942 | Mast | 130—6 |
| 2,573,887 | 11/1951 | Aasland | 146—121 |
| 2,830,771 | 4/1958 | Pallmann | 241—186 |
| 3,348,780 | 10/1967 | Barkstrom et al. | 241—101 |

W. GRAYDON ABERCROMBIE, *Primary Examiner.*